(12) United States Patent
Nakata et al.

(10) Patent No.: US 7,659,713 B2
(45) Date of Patent: Feb. 9, 2010

(54) ROTATIONAL ANGLE DETECTOR AND METHOD FOR INITIALIZING ROTATIONAL ANGLE DETECTOR

(75) Inventors: Takeshi Nakata, Aichi (JP); Seiji Kondo, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 516 days.

(21) Appl. No.: 11/681,403

(22) Filed: Mar. 2, 2007

(65) Prior Publication Data

US 2007/0205762 A1    Sep. 6, 2007

(30) Foreign Application Priority Data

Mar. 2, 2006    (JP) .............................. 2006-056131

(51) Int. Cl.
    *G01V 7/30*    (2006.01)
(52) U.S. Cl. .............................. 324/207.25; 324/207.12; 324/207.21
(58) Field of Classification Search ........................ None
    See application file for complete search history.

(56) References Cited

U.S. PATENT DOCUMENTS 6,675,124 B2 *  1/2004  Koga ........................... 702/151

6,931,312 B2 *  8/2005  Shin ............................. 701/41
7,583,080 B2 *  9/2009  Uehira et al. ........... 324/207.25

FOREIGN PATENT DOCUMENTS

JP    2004-309222    4/2004
JP    2004-077133    11/2004

* cited by examiner

*Primary Examiner*—Jay M Patidar
(74) *Attorney, Agent, or Firm*—Saul Ewing LLP

(57) ABSTRACT

A method for initializing a rotational angle detector detecting rotational angles of two driven gears mated with a drive gear, rotated integrally with a detection subject, and obtaining rotational angle of the detection subject from the detected rotational angles. The method includes obtaining a first error and second error in each rotational angle of the driven gears when the drive gear is rotated in forward and rearward directions, obtaining an average value of the first and second errors, obtaining a difference between the average value and a theoretical rotational angle for the two driven gears when the rotational angle of the drive gear is 0°, and storing the difference as correction data added to each actual rotational angle of the two driven gears when obtaining the rotational angle of the detection subject.

8 Claims, 6 Drawing Sheets

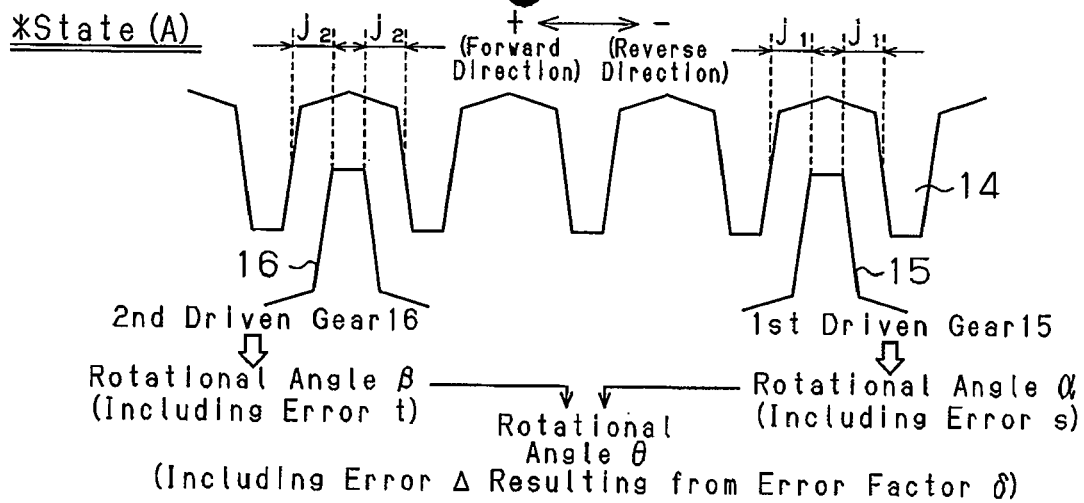
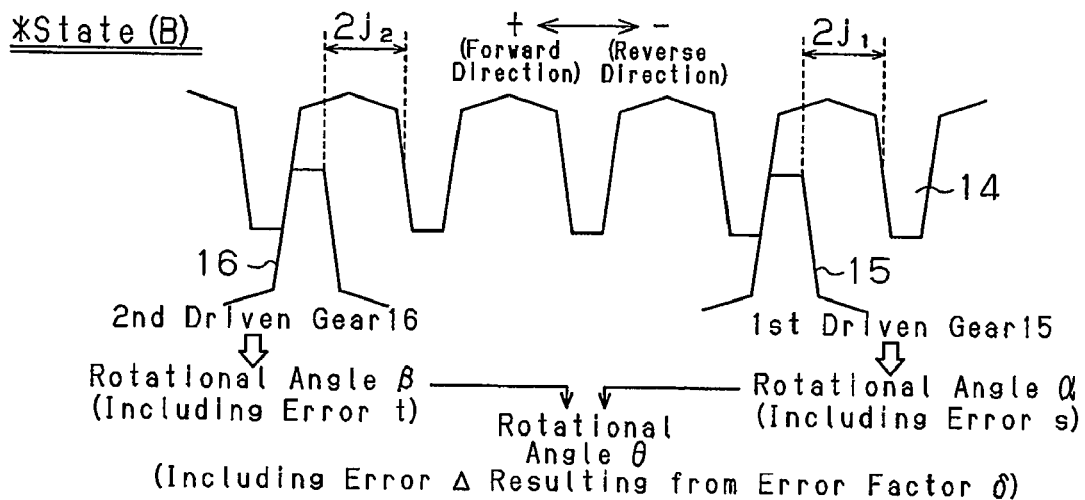
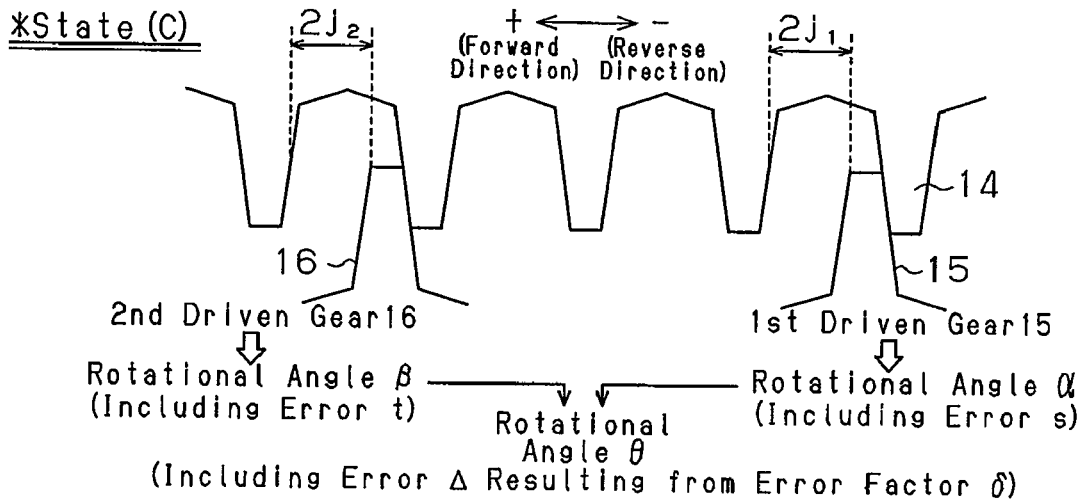

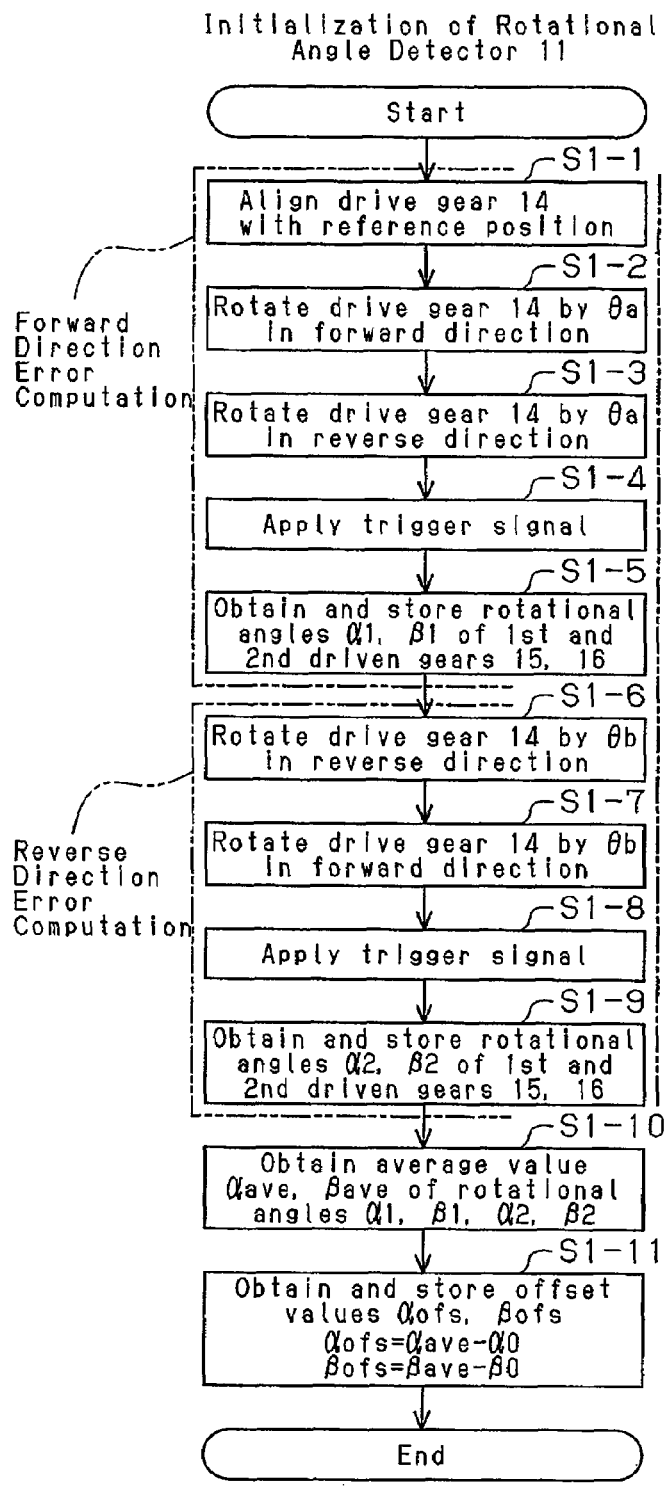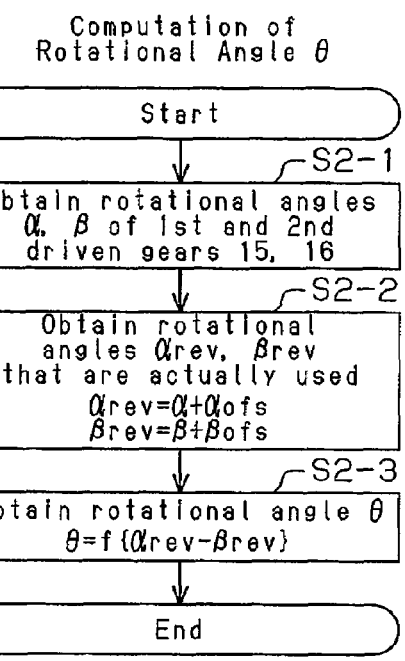

ROTATIONAL ANGLE DETECTOR AND METHOD FOR INITIALIZING ROTATIONAL ANGLE DETECTOR

CROSS-REFERENCE TO RELATED APPLICATIONS

This application is based upon and claims the benefit of priority from the prior Japanese Patent Application No. 2006-056131, filed on Mar. 2, 2006, the entire contents of which are incorporated herein by reference.

BACKGROUND OF THE INVENTION

The present invention relates to a rotational angle detector for detecting the angle of a rotational body, and a method for initializing a rotational angle detector.

Various systems for improving traveling stability such as a vehicle stability control system and an electronic control suspension system are being installed in recent vehicles, which have become highly sophisticated. These systems acquire the steering angle of a steering wheel as attitude information of the vehicle and control the vehicle so that the attitude of the vehicle is maintained in a stable state based on the attitude information. Accordingly, a rotational angle detector for detecting the steering angle of the steering wheel is incorporated in, for example, a steering column of the vehicle. Such type of a rotational angle detector employs an absolute angle detection technique, which detects the steering angle with an absolute value, or a relative angle detection technique, which detects the steering angle with a relative value. The detection technique that is employed is determined in accordance with the product specification and the like.

Japanese Laid-Open Patent Publication No. 2004-309222 describes an example of a rotational angle detector adopting the absolute angle detection technique. The rotational angle detector includes a drive gear that integrally rotates with the steering shaft, and two driven gears mated with the drive gear. A magnet is arranged on each driven gear to rotate integrally with the driven gear. The two driven gears have a different number of teeth. Thus, the two driven gears are rotated at different rotational angles by the rotation of the drive gear. The rotational angle detector has a controller that determines the rotational angles of the two driven gears with the corresponding magnetic sensors to obtain the rotational angle of the steering shaft.

However, this conventional rotational angle detector has the following problems. The drive gear is mated with the two driven gears. Thus, the detected rotational angles of the two driven gears contain errors resulting from backlash between the drive gear and the two driven gears. Accordingly, the rotational angle of the steering shaft obtained from the rotational angles of the two driven gears potentially contains an error (initial steering error). The vehicle system thus corrects the error in the rotational angle of the steering shaft and computes the true rotational angle of the steering shaft. In this case, however, a great amount of correction data for the rotational angle of the steering shaft is necessary. Further, the computation amount for the correction with the correction data is large. Such a correction process may be performed with the vehicle system. However, this would increase the computation load on the vehicle system.

The amount of the backlash between the drive gear and the driven gear differs when the drive gear rotates in the left direction and the right direction depending on the positional relationship between the drive gear and the two driven gears. In this case, the error (steering angle error) of the rotational angle of the steering shaft caused by a bias in the backlash also differs between left and right rotations. When taking into consideration that the error in the rotational angle may differ between left and right rotations of the steering shaft, the computation load on the rotational angle detector or on the vehicle system side of the vehicle further increases.

SUMMARY OF THE INVENTION

The present invention provides a rotational angle detector that reduces detection error caused by backlash between a drive gear and driven gears while decreasing computation load, and a method for initializing such a rotational angle detector.

One aspect of the present invention is a method for initializing a rotational angle detector for detecting rotational angles of two driven gears mated with a drive gear, which rotates integrally with a detection subject, and obtaining rotational angle of the detection subject from the detected rotational angles. The method includes the steps of obtaining a first error generated in each rotational angle of the two driven gears due to backlash between the drive gear and the two driven gears when the drive gear is rotated in a forward direction, obtaining a second error generated in each rotational angle of the two driven gears due to backlash between the drive gear and the two driven gears when the drive gear is rotated in a reverse direction, obtaining an average value of the first error and the second error, obtaining a difference between the average value and an error-free theoretical rotational angle for each of the two driven gears when the rotational angle of the drive gear is 0°, and storing the difference as correction data added to each actually detected rotational angle of the two driven gears when obtaining the rotational angle of the detection subject.

Another aspect of the present invention is a rotational angle detector for detecting rotational angles of two driven gears mated with a drive gear, which rotates integrally with a detection subject, and obtaining a rotational angle of the detection subject from the detected rotational angles. The rotational angle detector includes a memory for storing correction data. The correction data includes a difference between an average value of first and second errors and an error-free theoretical rotational angle for each of the two driven gears when the rotational angle of the drive gear is 0°. The first error is generated in each rotational angle of the two driven gears due to backlash between the drive gear and the two driven gears when the drive gear is rotated in a forward direction. The second error is generated in each rotational angle of the two driven gears due to backlash between the drive gear and the two driven gears when the drive gear is rotated in a reverse direction. A detector detects each rotational angle of the two driven gears. A controller adds the correction data stored in the memory to actual rotational angles of the two driven gears detected by the detector and obtains the rotational angle of the detection subject based on the rotational angles after the addition.

A further aspect of the present invention is a rotational angle detector for detecting rotational angles of two driven gears mated with a drive gear, which rotates integrally with a detection subject, and obtaining a rotational angle of the detection subject from the detected rotational angles. The rotational angle detector includes a storage means for storing correction data. The correction data includes a difference between an average value of first and second errors and an error-free theoretical rotational angle for each of the two driven gears when the rotational angle of the drive gear is 0°. The first error is generated in each rotational angle of the two driven gears due to backlash between the drive gear and the two driven gears when the drive gear is rotated in a forward direction. The second error is generated in each rotational angle of the two driven gears due to backlash between the drive gear and the two driven gears when the drive gear is rotated in a reverse direction. A detection means detects each rotational angle of the two driven gears. A control means adds the correction data stored in the storage means to actual rotational angles of the two driven gears detected by the detection means, and obtaining the rotational angle of the detection subject based on the rotational angles after the addition.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is an enlarged plan view showing the mating of a drive gear with first and second driven gears in state (A);

FIG. 5 is an enlarged plan view showing the mating of the drive gear with the first and second driven gears in state (B);

FIG. 6 is an enlarged plan view showing the mating of the drive gear with the first and second driven gears in state (C);

FIG. 9(a) is a flowchart showing the procedures for initializing the rotational angle detector;

FIG. 9(b) is a flowchart showing the procedures for computing the rotational angle of the steering shaft;

FIG. 11 is an enlarged plan view of the main parts showing the mating of the drive gear with the first and second driven gears when the drive gear is rotated in the forward direction after being rotated in the reverse direction to obtain reverse direction error; and.

DETAILED DESCRIPTION OF THE PREFERRED EMBODIMENTS

Figure 1:
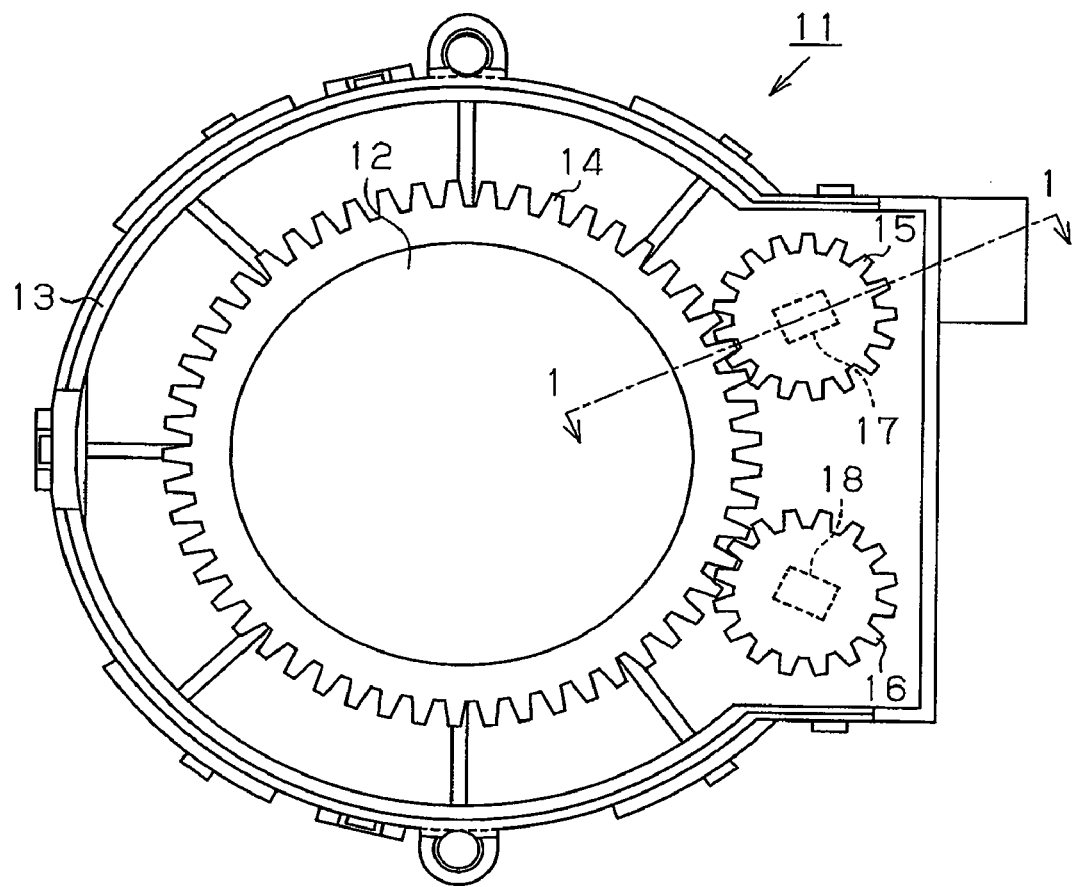
FIG. 1 is a cross-sectional plan view of a rotational angle detector of the present embodiment.

In the drawings, like numerals are used for like elements throughout.

A rotational angle detector 11 according to a preferred embodiment of the present invention for detecting the steering angle of a steering wheel will now be described with reference to FIG. 1.

As shown in FIG. 1, the rotational angle detector 11 is attached to a steering shaft 12. A steering wheel (not shown) is mounted on the steering shaft 12 so as to rotate integrally with the steering shaft 12. The rotational angle detector 11 includes a box-shaped housing 13 fixed to a structure (not shown), such as steering column, around the steering shaft 12. In the housing 13, a drive gear 14 is fitted to the steering shaft 12 so as to rotate integrally with the steering shaft 12, and first and second driven gears 15 and 16, which are mated with the drive gear 14, are rotatably supported. The number of teeth of the first driven gear 15 differs from the number of teeth of the second driven gear 16. Rotation of the steering shaft 12 integrally rotates the drive gear 14. This further rotates the first and second driven gears 15 and 16. Since the number of teeth of the first driven gear 15 differs from the number of teeth of the second driven gear 16, the rotational angles of the first and second driven gears 15 and 16 with respect to the rotational angle of the drive gear 14 are different. Furthermore, the first and second driven gears 15 and 16 respectively include first and second magnets (permanent magnets) 17 and 18, which rotate integrally with the first and second driven gears 15 and 16.

Figure 2:
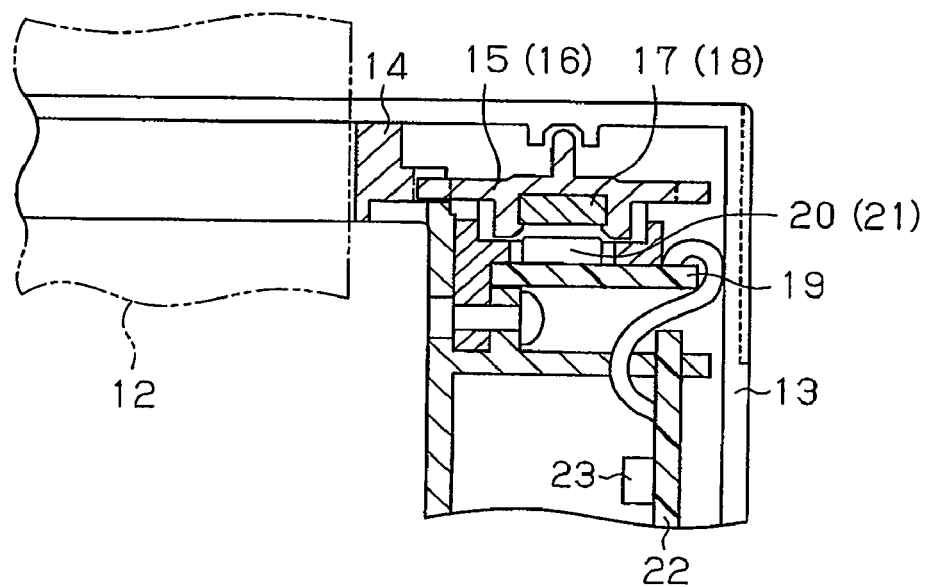
FIG. 2 is a cross-sectional view taken along line 1-1.

As shown in FIG. 2, the first and second magnets 17 and 18 are arranged so as to face downward through an opening in the lower part of the first and second driven gears 15 and 16. A printed circuit board 19 is arranged in the housing 13 at the lower sides of the first and second driven gears 15 and 16. The printed circuit board 19 extends orthogonal to the rotational axis of the first and second driven gears 15 and 16. First and second magnetic sensors 20 and 21 are arranged on the upper surface of the printed circuit board 19 so as to face the first and second magnets 17 and 18, respectively. Another printed circuit board 22 is arranged in the housing 13 at the lower side of the printed circuit board 19 and extends orthogonal to the printed circuit board 19. A microcomputer 23 is arranged on the surface of the printed circuit board 22.

<Electrical Configuration>

Figure 3:
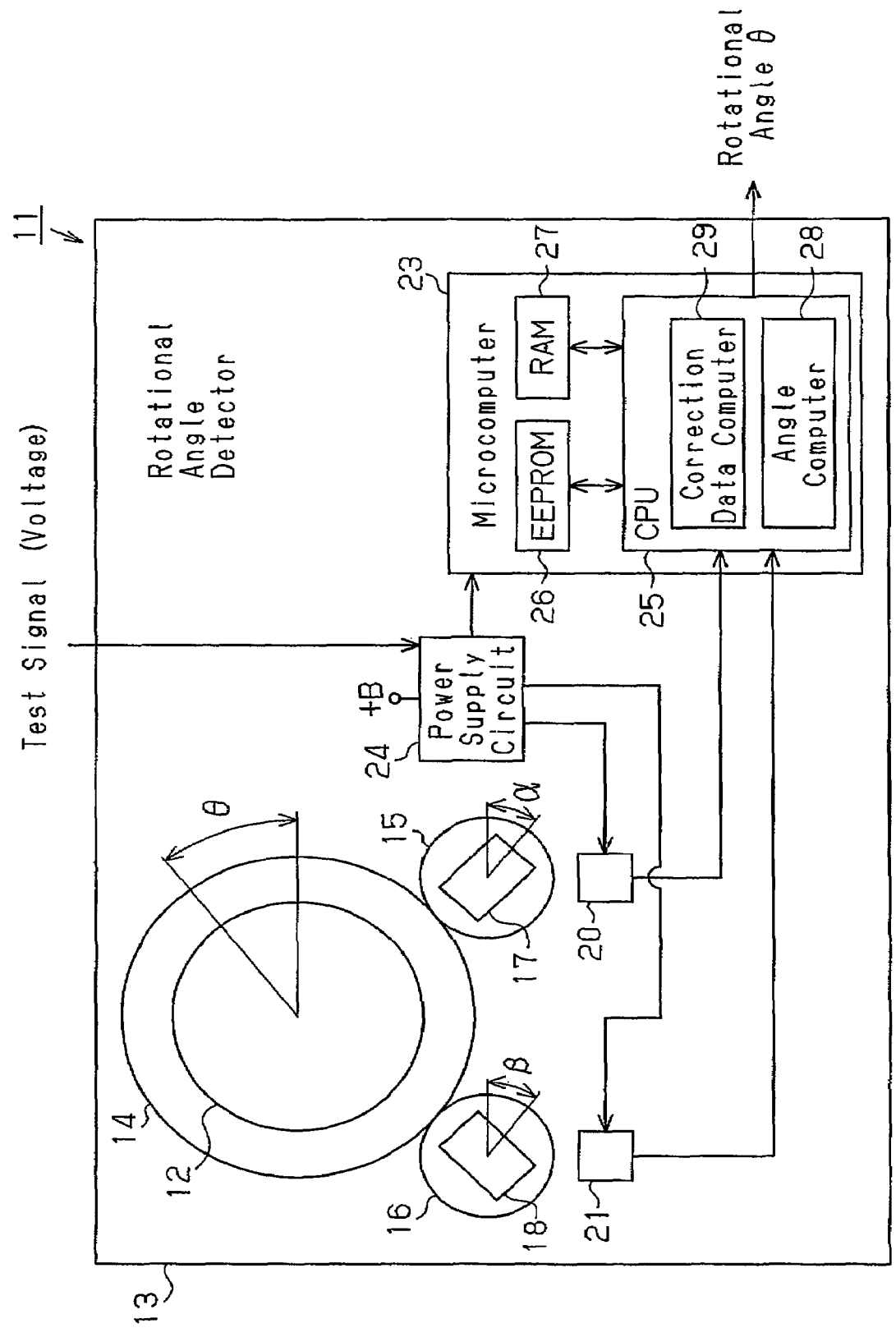
FIG. 3 is a block diagram showing the electrical configuration of the rotational angle detector of the present embodiment.

The electrical configuration of the rotational angle detector 11 will now be described. As shown in FIG. 3, the rotational angle detector 11 includes a power supply circuit 24 in addition to the first and second magnetic sensors 20 and 21 and the microcomputer 23. The power supply circuit 24 converts the voltage supplied from a battery (not shown) of the vehicle to voltages of predetermined levels suitable for each component of the rotational angle detector 11, such as the first and second magnetic sensors 20 and 21 and the microcomputer 23 and supplies the converted voltages to these components. The first and second magnetic sensors 20 and 21 and the microcomputer 23 are operated using the stable supply of voltage having a predetermined level from the power supply circuit 24 as an operational power.

<First and Second Magnetic Sensors>

The first and second magnetic sensors 20 and 21 each include a circuit in which four anisotropic magneto-resistance elements (AMR element) are bridge-connected. The anisotropic magneto-resistance element includes a ferromagnet of Ni—Co or the like that has an anisotropic magneto-resistance effect. The resistance value of the anisotropic magneto-resistance element changes in accordance with the applied magnetic field (more precisely, the direction of the magnetic flux). The first and second magnetic sensors 20 and 21 generate a median potential of the bridge shaped circuit as a detection signal of the magnetic flux in accordance with a change in the applied magnetic field (more precisely, change in direction of the magnetic flux).

The first magnetic sensor 20 detects changes in the direction of the magnetic flux generated by the first magnet 17 as the first driven gear 15 rotates and generates an analog signal that changes continuously in accordance with the rotational angle α of the first driven gear 15. That is, the first magnetic sensor 20 generates a sine signal complying with the sine function and a cosine signal complying with the cosine function. The analog signal of the first magnetic sensor 20 is provided to the microcomputer 23. The second magnetic sensor 21 detects changes in the direction of the magnetic flux generated by the second magnet 18 as the second driven gear 16 rotates and generates an analog signal that changes continuously in accordance with the rotational angle β of the second driven gear 16. That is, the second magnetic sensor 21 generates a sine signal complying with the sine function and a cosine signal complying with the cosine function. The analog signal of the second magnetic sensor 21 is provided to the microcomputer 23.

<Microcomputer>

The microcomputer 23 includes a central processing unit (CPU) 25, an electrically erasable programmable ROM (EEPROM) 26, and a random access memory (RAM) 27.

Various control programs and data for controlling the entire rotational angle detector 11 are stored beforehand in the EEPROM 26. The RAM 27 expands the control program of the EEPROM 26 and functions as a data storage region, or work region, for the CPU 25 to execute various processes.

The control programs stored in the EERPOM 26 include a correction data calculation program and a rotational angle calculation program. The correction data calculation program is a program executed to obtain angular data for correcting the detection error of the rotational angle θ caused by backlashes between the drive gear 14 and the first and second driven gears 15 and 16, more specifically, the rotational angles α and β of the first and second driven gears 15 and 16. The correction data calculation program is executed in an initial assembly stage of the rotational angle detector 11, and the correction data obtained through the program is stored in the EEPROM 26. The procedures for obtaining the correction data will be described later. The rotational angle calculation program is a program executed to obtain the rotational angles α and β of the first and second driven gears 15 and 16 based on the detection signals from the first and second magnetic sensors 20 and 21, correct the rotational angles α and β using the correction data, and obtain the rotational angle θ of the steering shaft 12 as an absolute value based on the difference between the corrected rotational angles α and β.

As shown in FIG. 3, the CPU 25 includes an angle computer 28 and a correction data computer 29. The correction data computer 29 obtains the correction data of the first and second driven gears 15 and 16 with the correction data calculation program stored in the EEPROM 26 during the initial assembly stage of the rotational angle detector 11. The angle computer 28 obtains the rotational angle θ of the steering shaft 12 with the rotational angle calculation program stored in the EEPROM 26.

As described above, the number of teeth of the first driven gear 15 differs from the number of teeth of the second driven gear 16 in the present embodiment. Thus, the value of the rotational angle α of the first driven gear 15 differs from the value of the rotation angle β of the second driven gear 16 when the drive gear 14 is rotated. Thus, when the steering wheel is rotated from a neutral position (steering angle of 0°), the difference between the rotational angles α and β of the first and second driven gears 15 and 16 changes linearly with respect to changes in the steering angle. That is, the difference between the rotational angles α and β becomes a value unique to the rotational angle θ of the drive gear 14 since the rotation angle θ of the steering shaft 12 has a proportional relationship with the difference between the rotational angles α and β of the first and second driven gears 15 and 16. The rotational angle θ (absolute value) of the drive gear 14, that is, the steering shaft 12 is thus readily determined based on the difference between the rotational angles α and β.

More specifically, the rotational angle θ of the steering shaft 12 is a function of the difference between the rotational angles α and β of the first and second driven gears 15 and 16 and is expressed by equation 1.

$$\theta = f\{(\alpha-\beta)\} \qquad \text{equation 1}$$

The angle computer 28 of the CPU 25 uses the correction data stored in the EEPROM 26 to correct the calculated rotational angles α and β of the first and second driven gears 15 and 16. The angle computer 28 uses the difference between the corrected rotational angles α and β to calculate the rotational angle θ of the drive gear 14, or the steering shaft 12, based on equation 1. The microcomputer 23 provides the rotational angle θ calculated with equation 1 to various systems (more accurately, control devices of the systems) in order to improve the traveling stability with the vehicle stability control system, the electronic control suspension system, and the like.

<Detection Error of Rotational Angle θ>

The detection error of the rotational angle detector 11 will now be described. The rotational angle detector 11 includes the drive gear 14 mated with the first and second driven gears 15 and 16, as described above. The rotational angles α and β of the first and second driven gears 15 and 16 contain errors s and t caused by backlashes between the drive gear 14 and the first and second driven gears 15 and 16. Therefore, the rotational angle θ of the steering shaft 12, which is obtained from the rotational angles α and β of the first and second driven gears 15 and 16, also potentially contains an error (steering error).

Therefore, the rotational angle θ of the steering shaft 12 can be expressed as equation 2 based on equation 1 in view of errors s and t, which are contained in the rotational angles α and β of the first and second driven gears 15 and 16.

$$\theta = f\{(\alpha+s)-(\beta+t)\} = f\{(\alpha-\beta)+(s-t)\} \qquad \text{equation 2}$$

The influence of the variable part (s−t) in equation 2 is the error Δ (steering error) with respect to the true value of the rotational angle θ. The error factor δ is expressed by the variable part (s−t), as shown in equation 3.

$$\delta = s-t \qquad \text{equation 3}$$

The error Δ takes different values when the drive gear 14 is rotated in the forward direction (right direction) and when the drive gear 14 is rotated in the reverse direction (left direction) due to the positional relationship between the drive gear 14 and the first and second driven gears 15 and 16. When the rotational angle θ calculated from equation 1 is used by a system, such as the vehicle stability control system or the electronic control suspension system, the system does not just consider only the error Δ of the rotational angle θ but must also consider that the error Δ differs between the left and right rotation of the steering wheel.

The positional relationships between the drive gear 14 and the first and second driven gears 15 and 16 may be categorized into the five states of (A) to (E) when operating the steering wheel. Here, in states (A) to (E) the states of contact between the-teeth surfaces of the drive gear 14 and the first and second driven gears 15 and 16 are simply referred to as contact or non-contact.

In state (A), the drive gear 14 and the first and second driven gears 15 and 16 are all in non-contacting. In state (B), the first and second driven gears 15 and 16 both contact the left side of the drive gear 14. In state (C), the first and second driven gears 15 and 16 are in contact with the right side of the drive gear 14. In state (D), the first driven gear 15 is in contact-with the left side of the drive gear 14, and the second driven gear 16 is in contact with the right side of the drive gear 14. In state (E), the first driven gear 15 is in contact with the right side of the drive gear 14, and the second driven gear 16 is contacting the left side of the drive gear 14.

The values of an error factor δ in the error Δ between the true value of the rotational angle θ of the steering shaft 12 (actual steering angle of the steering wheel) and the calculated value of the rotational angle θ obtained from the rotational angles α and β of the first and second driven gears 15 and 16 for states (A) to (E) are shown below. In the following calculation, the rotational angle of the first driven gear 15 is represented by α, the rotational angle of the second driven gear 16 is represented by β, the backlash between the drive gear 14 and the first driven gear 15 is represented by $j_1$, and the backlash between the drive gear 14 and the second driven gear 16 is represented by $j_2$.

The positional relationship of the first and second driven gears 15 and 16 when the error Δ takes a maximum value or a minimum value can be categorized into the two states of (F) and (G) since the variable substituted to equation 1 is the difference (α−β) between the rotational angles α and β of the first and second driven gears 15 and 16.

In state (F), the first and second driven gears 15 and 16 are near each other. In state (G), the first and second driven gears 15 and 16 are separated from each other.

The error factor δ (maximum value and minimum value) when the first and second driven gears 15 and 16 are in the positional relationship of the two states (F) and (G) in each of the five states (A) to (E) will now be described. In FIGS. 4 to 8, rotation in the forward direction (right direction) of the drive gear 14 is indicated by the positive symbol "+", and rotation in the reverse direction (left direction) is indicated by the negative symbol "−".

<State (A)>

As shown in FIG. 4, when the drive gear 14 and the first and second driven gears 15 and 16 are in the positional relationship of state (A) and the first and second driven gears 15 and 16 are near each other in the positional relationship of state (F), the first and second driven gears 15 and 16 are displaced by angle $(\alpha+j_1, \beta-j_2)$ from the positions of state (A). Furthermore, when the drive gear 14 and the first and second driven gears 15 and 16 are in the positional relationship of state (A) and the first and second driven gears 15 and 16 are separated from each other in the positional relationship of state (G), the first and second driven gears 15 and 16 are displaced by angle $(\alpha-j_1, \beta+j_2)$ from the positions of state (A) The rotational angle θ of the steering shaft 12 is represented by a function of the difference between the rotational angles α and β of the first and second driven gears 15 and 16 as shown by equation 1. Thus, the value of the error factor δ is represented as shown below.

$(\alpha+j_1)-(\beta-j_2)=(\alpha-\beta)+(j_1+j_2)$ $(\alpha-j_1)-(\beta+j_2)=(\alpha-\beta)-(j_1+j_2)$ Therefore, the error factor is expressed as $\delta=\pm(j_1+j_2)$.

<State (B)>

As shown in FIG. 5, when the drive gear 14 and the first and second driven gears 15 and 16 are in the positional relationship of state (B) and the first and second driven gears 15 and 16 are near each other in the positional relationship of state (F), the first and second driven gears 15 and 16 are displaced by angle $(\alpha$ and $\beta-2j_2)$ from the positions of state (B). Furthermore, when the drive gear 14 and the first and second driven gears 15 and 16 are in the positional relationship of state (B) and the first and second driven gears 15 and 16 are separated from each in the positional relationship of state (G), the first and second driven gears 15 and 16 are displaced by angle $(\alpha-2j_1, \beta)$ from the positions of state (B). The rotational angle θ of the steering shaft 12 is represented by a function of the difference between the rotational angles α and β of the first and second driven gears 15 and 16 as shown by equation 1. Thus, the value of the error factor δ is represented as shown below.

$\alpha-(\beta-2j_2)=(\alpha-\beta)+2j_2$ $(\alpha-2j_1)-\beta=(\alpha-\beta)-2j_1$ Therefore, the error factor is expressed as $\delta=-2j_1, +2j_2$.

<State (C)>

As shown in FIG. 6, when the drive gear 14 and the first and second driven gears 15 and 16 are in the positional relationship of state (C) and the first and second driven gears 15 and 16 are near each other in the positional relationship of state (F), the first and second driven gears 15 and 16 are displaced by angle $(\alpha+2j_1, \beta)$ from the positions of state (C). Furthermore, when the drive gear 14 and the first and second driven gears 15 and 16 are in the positional relationship of state (C) and the first and second driven gears 15 and 16 are separated from each in the positional relationship of state (G), the first and second driven gears 15 and 16 are displaced by angle $(\alpha$ and $\beta+2j_2)$ from the positions of state (C). The rotational angle θ of the steering shaft 12 is represented by a function of the difference between the rotational angles α and β of the first and second driven gears 15 and 16 as shown by equation 1. Thus, the value of the error factor δ is represented as shown below.

$(\alpha+2j_1)-\beta=(\alpha-\beta)+2j_1$ $\alpha-(\beta+2j_2)=(\alpha-\beta)-2j_2$ Therefore, the error factor is expressed as $\delta=+2j_1, -2j_2$.

<State (D)>

Figure 7:
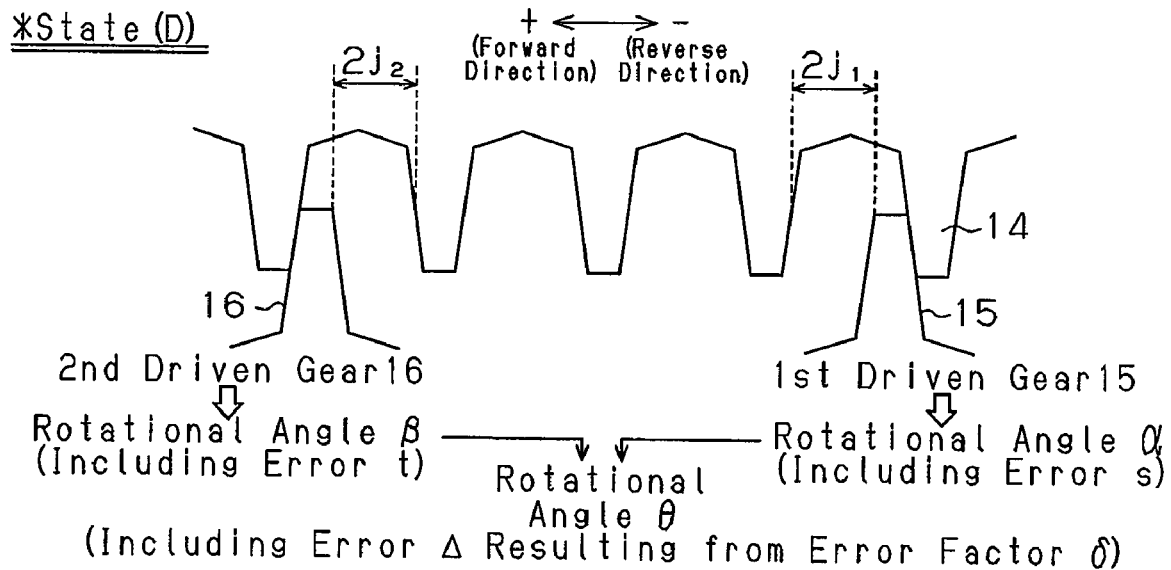
FIG. 7 is an enlarged plan view showing the mating of the drive gear with the first and second driven gears in state (D)

As shown in FIG. 7, when the drive gear 14 and the first and second driven gears 15 and 16 are in the positional relationship of state (D) and the first and second driven gears 15 and 16 are near each other in the positional relationship of state (F), the first and second driven gears 15 and 16 are displaced by angle $(\alpha+2j_1, \beta-2j_2)$ from the positions of state (D). Furthermore, when the drive gear 14 and the first and second driven gears 15 and 16 are in the positional relationship of state (D) in which the first and second driven gears 15 and 16 are separated from each other in the positional relationship of state (G), the first and second driven gears 15 and 16 are located at the present position, that is, (α and β). The rotational angle θ of the steering shaft 12 is represented as a function of the difference between the rotational angles α and β of the first and second driven gears 15 and 16 as shown by equation 1. Thus, the value of the error factor δ is represented as shown below.

$(\alpha+2j_1)-(\beta-2j_2)=(\alpha-\beta)+2(j_1+j_2)$ $\alpha-\beta=\alpha-\beta+0$ Therefore, the error factor is expressed as $\delta=+2(j_1+j_2), 0$.

<State (E)>

Figure 8:
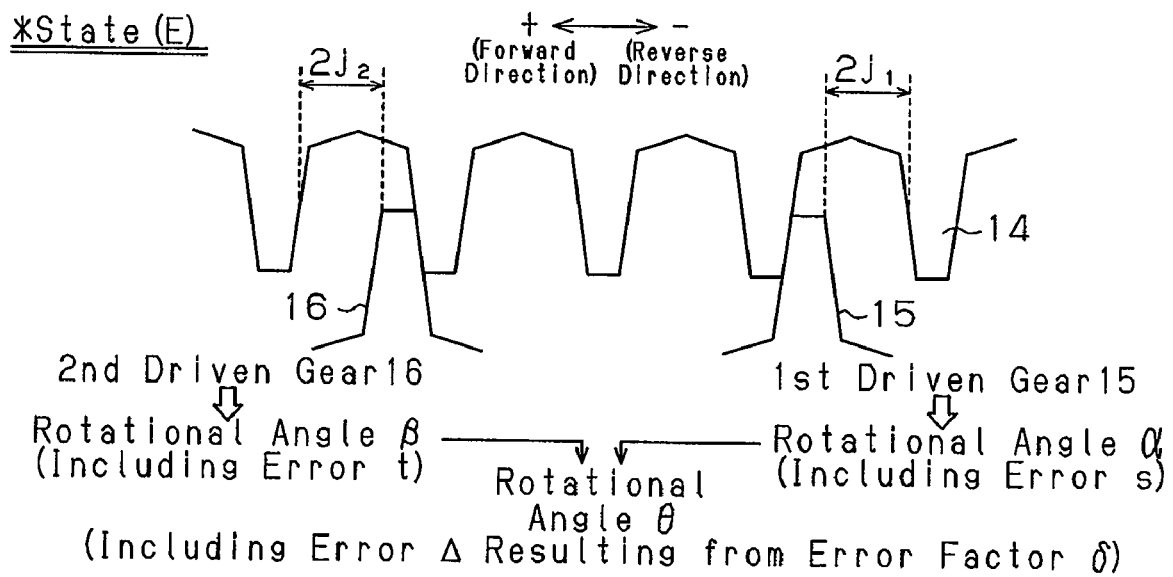
FIG. 8 is an enlarged plan view showing the mating of the drive gear with the first and second driven gears in state (E)

As shown in FIG. 8, when the drive gear 14 and the first and second driven gears 15 and 16 are in the positional relationship of state (E) and the first and second driven gears 15 and 16 are near each other in the positional relationship of state (F), the first and second driven gears 15 and 16 are located at the present position, that is, ($\alpha$ and $\beta$). Furthermore, when the drive gear 14 and the first and second driven gears 15 and 16 are in the positional relationship of state (E) and the first and second driven gears 15 and 16 are separated from each other in the positional relationship of state (E), the first and second driven gears 15 and 16 are displaced by angle ($\alpha-2j_1$, $\beta+2j_2$) from the positions of state (E). The rotational angle $\theta$ of the steering shaft 12 is represented by a function of the difference between the rotational angles $\alpha$ and $\beta$ of the first and second driven gears 15 and 16 as shown by equation 1. Thus, the value of the error factor $\delta$ is represented as shown below.

$$\alpha-\beta=\alpha-\beta+0$$

$$(\alpha-2j_1)-(\beta+2j_2)=(\alpha-\beta)-2(j_1+j_2)$$

Therefore, the error factor is expressed as $\delta=0, -2(j_1+j_2)$.

The magnitude (absolute value) of the error factor $\delta$ of when the amount of the backlashes $j_1$ and $j_2$ between the drive gear 14 and the first and second driven gears 15 and 16 are in any one of the three relationships of "$j_1=j_2$", "$j_1>j_2$", and "$j_1<j_2$" will now be compared and discussed for each state (A) to (E).

When the relationship of "$j_1=j_2$" is satisfied in state (A), the error factor $\delta$ has the smallest value like in state (B) and state (C). When the relationship of "$j_1>j_2$" or "$j_1<j_2$" is satisfied in state (A), the error factor $\delta$ has a relatively small value when compared to state (B) to state (E). Furthermore, in state (A), the error factor $\delta$ in the forward direction and the error factor $\delta$ in the reverse direction are the same even if any one of the relationships of "$j_1=j_2$", "$j_1>j_2$", "$j_1<j_2$" is satisfied.

When the relationship of "$j_1=j_2$" is satisfied in state (B), the error factor $\delta$ has the smallest value like in state (A) and state (C). When the relationship of "$j_1>j_2$" or "$j_1<j_2$" is satisfied in state (B), the error factor $\delta$ has a relatively small value when compared to state (A) and state (C) to state (E). In state (B), the error factor $\delta$ in the forward direction and the error factor $\delta$ in the reverse direction are the same when the relationship of "$j_1=j_2$" is satisfied. However, the error factor $\delta$ in the forward direction and the error factor $\delta$ in the reverse direction are different when the relationship of "$j_1>j_2$" or "$j_1<j_2$" is satisfied.

When the relationship of "$j_1=j_2$" is satisfied in state (C), the magnitude of the error factor $\delta$ has the smallest value like in state (A) and state (B). When the relationship of "$j_1>j_2$" or "$j_1<j_2$" is satisfied in state (C), the magnitude of the error factor $\delta$ has a relatively small value among the error factors $\delta$ in other states of state (A), state (B), state (D), and state (E). In state (C), the error factor $\delta$ in the forward direction and the error factor $\delta$ in the reverse direction are the same when the relationship of "$j_1=j_2$" is satisfied, but the error factor $\delta$ in the forward direction and the error factor $\delta$ in the reverse direction are different when the relationship of "$j_1>j_2$" or "$j_1<j_2$" is satisfied.

When the relationship of "$j_1=j_2$" is satisfied in state (D), the magnitude of the error factor $\delta$ has the largest value like in state (E). When the relationship of "$j_1>j_2$" or "$j_1<j_2$" is satisfied in state (D), the error factor $\delta$ has the largest value like in state (E). In state (D), the error factor $\delta$ in the forward direction and the error factor $\delta$ in the reverse direction are different even if any one of the relationships of "$j_1=j_2$", "$j_1>j_2$" or "$j_1<j_2$" is satisfied. Furthermore, in state (D), the difference between the error factor $\delta$ in the forward direction and the error factor $\delta$ in the reverse direction is the largest like in state (E).

Finally, when the relationship of "$j_1=j_2$" is satisfied in state (E), the error factor $\delta$ has the largest value like in state (D). When the relationship of "$j_1>j_2$" or "$j_1<j_2$" is satisfied in state (E), the error factor $\delta$ has the largest value like in state (D). In state (E), the error factor $\delta$ in the forward direction and the error factor $\delta$ in the reverse direction are different even if any one of the relationship of "$j_1=j_2$", "$j_1>j_2$", "$j_1<j_2$" is satisfied. Furthermore, in state (E), the difference between the error factor $\delta$ in the forward direction and the error factor $\delta$ in the reverse direction is the largest like in state (D).

Accordingly, among states (A) to (E), it is apparent that in state (A), the error factor $\delta$ has a relatively small value, and the error factor $\delta$ in the forward direction and the error factor $\delta$ in the reverse direction always have the same value (more accurately, approximately the same value). That is, among states (A) to (E), the error $\Delta$ with respect to the rotational angle $\theta$ of the rotational angle detector 11 is most stable when the positional relationship of the drive gear 14 and the first and second driven gears 15 and 16 is in state (A). Thus, it is preferable that the drive gear 14 and the first and second driven gears 15 and 16 are set in the positional relationship of state (A).

However, when the rotational angle detector 11 tentatively detects the steering angle as 0° when the rotational angle detector 11 is in an initial assembly initial stage, the positional relationship of the drive gear 14 and the first and second driven gears 15 and 16 differs between products and may be in any one states (A) to (E). Therefore, in the present embodiment, the rotational angle detector 11 is initialized to calculate the rotational angle $\theta$ in state (A) regardless of whether the actual positional relationship of the drive gear 14 and the first and second driven gears 15 and 16 is any one of states (A) to (E).

<Initialization of Rotational Angle Detector>

The initialization of the rotational angle detector 11 will now be described with reference to the flowchart of FIG. 9(a).

When initializing the rotational angle detector 11, the steering shaft 12, or the drive gear 14, is first aligned with a reference position so that the steering angle is 0° (step S1-1). It is not known at this point which one of states (A) to (E) the positional relationship of the drive gear 14 and the first and second driven gears 15 and 16 is in.

Then, the drive gear 14 is rotated by a predetermined angle $\theta$a in the forward direction (right rotational direction) from the reference position (step S1-2).

Subsequently, the drive gear 14 is rotated by the predetermined angle $\theta$a in the reverse direction (left rotational direction) from the position of step S1-2 to return the drive gear 14 to the reference position (step S1-3).

Figure 10:
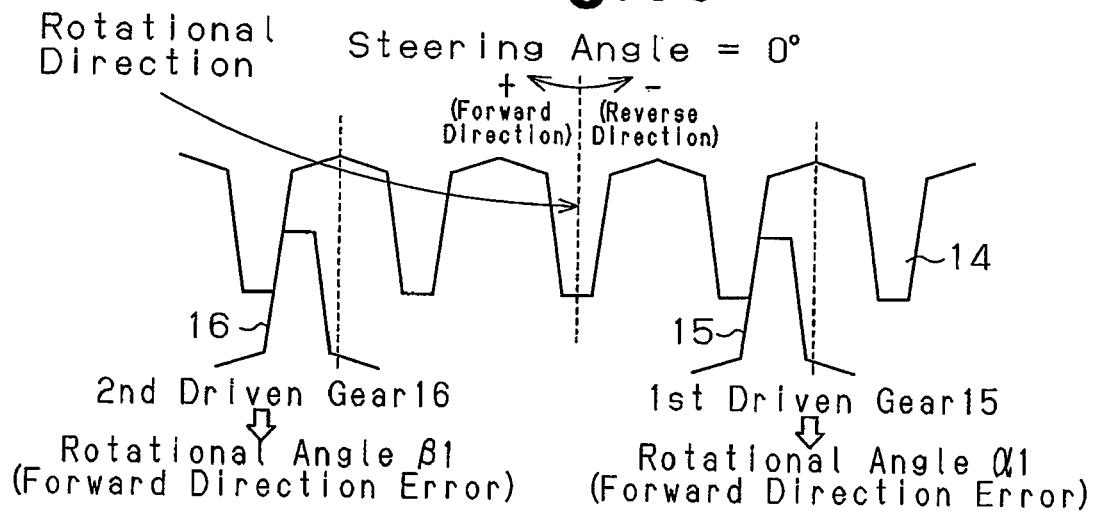
FIG. 10 is an enlarged plan view showing the mating of the drive gear with the first and second driven gears when the drive gear is rotated in the reverse direction after being rotated in the forward direction to obtain forward direction error.

The positional relationship of the drive gear 14 and the first and second driven gears 15 and 16 at this point is in the state shown in FIG. 10. That is, the first and second driven gears 15 and 16 are both in contact with the left side of the drive gear 14.

Next, an external trigger signal (voltage) such as a test signal is applied to the rotational angle detector (step S1-4). The first and second magnetic sensors 20 and 21 then use the trigger signal as operation power to generate an output signal that is in accordance with the direction of the magnetic flux presently generated by the first and second magnets 17 and 18.

The correction data computer 29 of the microcomputer 23 obtains the present rotational angles $\alpha1$ and $\beta1$ of the first and second driven gears 15 and 16 based on the output signal. Then, the correction data computer 29 stores the rotational angles $\alpha1$ and $\beta1$ in the EEPROM 26 (S1-5). The rotational angles $\alpha1$ and $\beta1$ are errors of the rotational angles of the first and second driven gears 15 and 16 caused by the backlashes between the drive gear 14 and the first and second driven gears 15 and 16 when the steering shaft 12 (drive gear 14) is rotated in the forward direction (hereinafter referred to as "forward direction error").

The drive gear 14 is then rotated by a predetermined angle θb in the reverse direction (left rotational direction) from the position of step S1-3, that is, the reference position (step S1-6).

Subsequently, the drive gear 14 is rotated by the predetermined angle θb in the forward direction (right rotational direction) from the position of step S1-6 to return the drive gear 14 to the reference position (step S1-7).

Figure 11:
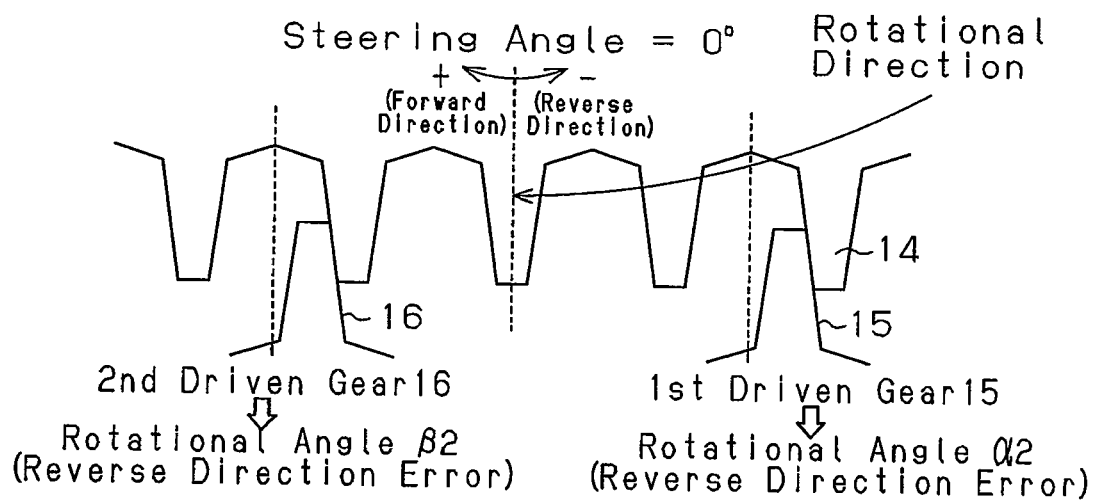

The positional relationship of the drive gear 14 and the first and second driven gears 15 and 16 at this point is in the state shown in FIG. 11. That is, the first and second driven gears 15 and 16 are both in contact with the right side of the drive gear 14.

Then, in the same manner as in step S1-4, a trigger signal is applied to the rotational angle detector 11 (step S1-8). The correction data computer 29 stores the present rotational angles α2 and β2 of the first and second driven gears 15 and 16 in the EEPROM 26 (S1-9). The rotational angles α2 and β2 are the errors of the rotational angles of the first and second driven gears 15 and 16 caused by the backlashes between the drive gear 14 and the first and second driven gears 15 and 16 when the steering shaft 12 (drive gear 14) is rotated in the reverse direction (hereinafter referred to as "reverse direction error").

The correction data computer 29 then obtains rotational angles αave and βave, which are the average values of the rotational angles α1 and β1 of the first and second driven gears 15 and 16 obtained in step S1-5 and step S1-9 based on equation 4 and equation 5 (step S1-10).

$$\alpha ave=(\alpha 1+\alpha 2)/2 \qquad \text{equation 4}$$

$$\beta ave=(\beta 1+\beta 2)/2 \qquad \text{equation 5}$$

Figure 12:
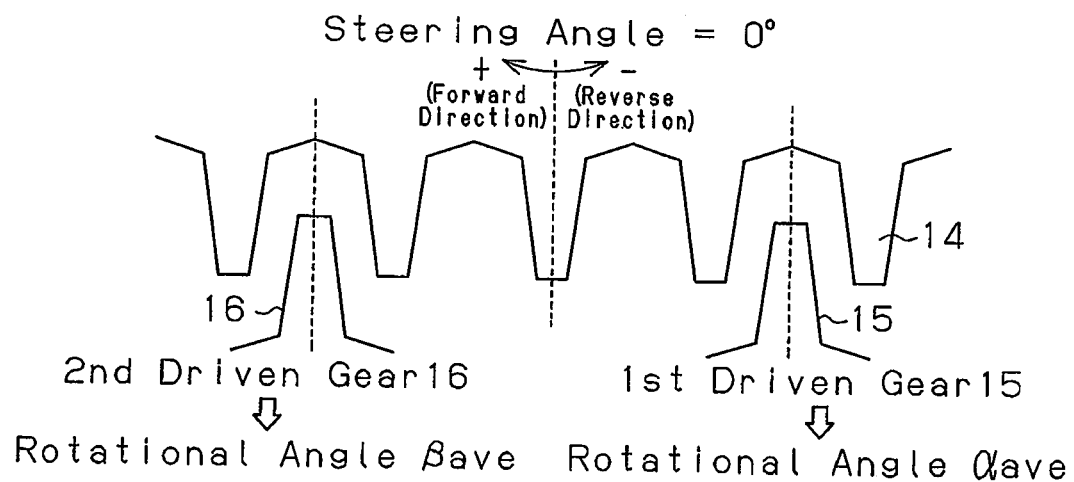
FIG. 12 is an enlarged plan view showing the mating of the drive gear with the first and second driven gears when the forward direction error and the reverse direction error are equal.

The rotational angles αave and βave of the first and second driven gears 15 and 16 obtained with equation 4 and equation 5 are the rotational angles for when the first and second driven gears 15 and 16 are held at the positions shown in FIG. 12. The positions shown in FIG. 12 are where the backlash between the drive gear 14 and the first driven gear 15 and the backlash between the drive gear 14 and the second driven gear 16 are the same on the left and right sides, that is, where the forward direction error and the reverse direction error are equal to each other.

The correction data computer 29 then obtains the difference between theoretical rotational angles α0 and β0 of the first and second driven gears 15 and 16 at which the error Δ (error factor δ) is zero when the steering angle is 0° and the rotational angles αave and βave obtained in step S1-10 (step S1-11) The values of the theoretical rotational angles α0 and β0 of the first and second driven gears 15 and 16 at which the errors Δ (error factor δ) is zero when the steering angle is 0° are stored in advance in the EEPROM 26.

The correction data computer 29 stores the above differences (angles) in the EEPROM 26 as offset values αofs and βofs, or correction data for the first and second driven gears 15 and 16, as shown in equation 6 (step S1-12).

$$\alpha ofs \text{ and } \beta ofs = \alpha ave - \alpha 0, \beta ave - \beta 0 \qquad \text{equation 6}$$

This completes the initialization of the rotational angle detector 11. After the initialization is completed, the correction data computer 29 reads the offset values αofs and βofs stored in the EEPROM 26 whenever the rotational angle detector 11 is activated. Then, the correction data computer 29 uses the read values to obtain the rotational angle θ of the steering shaft 12. Therefore, the processes of steps S1-1 to S1-12 are performed when the rotational angle detector 11 is first activated (i.e., when manufactured). Thus, steps S1-1 to S1-12 are not executed whenever the rotational angle detector 11 is activated.

<Computation of the Rotational Angle θ>

The computation of the rotational angle θ of the steering shaft 12 with the rotational angle detector 11 will now be described reference to the flowchart shown in FIG. 9(b).

During actual use (activation) of the rotational angle detector 11, the angle computer 28 of the microcomputer 23 reads the offset values αofs and βofs stored in the EEPROM 26. Then, the angle computer 28 uses the read offset values αofs and βofs to correct the rotational angles α and β of the first and second driven gears 15 and 16, which are calculated from the detection signals of the first and second magnetic sensors 20 and 21. The angle computer 28 then obtains the rotational angle θ of the steering shaft 12 based on the corrected rotational angles α and β. That is, the angle computer 28 calculates the rotational angles α and β of the first and second driven gears 15 and 16, which are rotated when the steering wheel is rotated, in predetermined control cycles (step S2-1).

Subsequently, the angle computer 28 obtains the rotational angles αrev and βrev that are actually used to calculate the rotational angle θ by adding the offset values αofs and βofs stored in the EEPROM 2-6 to the rotational angles α and β calculated in step. S2-1 (step S2-2).

$$\alpha rev = \alpha + \alpha ofs \qquad \text{equation 7}$$

$$\beta rev = \beta + \beta ofs \qquad \text{equation 8}$$

As shown in equation 9, the angle computer 28 obtains the rotational angle θ of the steering shaft 12 as an absolute value by substituting the corrected rotational angles αrev and βrev calculated in step S2-2 to equation 1 (step S2-3).

$$\theta = f\{\alpha rev - \beta rev\} \qquad \text{equation 9}$$

The above processes obtain the rotational angle θ when the error Δ (steering angle) is the same for rotation in the forward direction and the reverse direction. That is, the rotational angle θ for state (A).is calculated irrespective of whether the actual positional relationship of the drive gear 14 and the first and second driven gears 15 and 16 are in any one of states (A) to (E). Thus, the error Δ (error factor δ) of the rotational angle θ is minimized, and the error Δ caused by a backlash becomes the same when the steering wheel is rotated in the left direction and the right direction. The rotational angle θ of the steering shaft 12 is thus obtained more accurately. The microcomputer 23 sends the rotational angle θ, which is accurately calculated by the angle computer 28, to various systems (more accurately, to the controllers of such systems) to improve the traveling stability of the vehicle stability control system, the electronic control suspension system, and the like.

The rotational angle detector 11 of the present embodiment has the advantages described below.

(1) The initialization of the rotational angle detector 11 includes a step (S1-2 to S1-5) for obtaining the rotational angles α1 and β1 of the first and second driven gears 15 and 16, which are the forward direction errors, and a step (S1-6 to S1-9) for obtaining the rotational angles α2 and β2 of the first and second driven gears 15 and 16, which are the reverse direction errors. The initialization further includes a step (S1-11) for obtaining the rotational angles αave and βave, which are the average values between the forward direction error and the reverse direction error, and a step for obtaining the offset values αofs and βofs, which are the difference between the theoretical rotational angles α0 and β0 of the first and second driven gears 15 and 16 that do not contain error or when the rotational angle of the drive gear 14 is 0°, and the rotational angles αave and βave. Furthermore, the initialization includes a step (S1-11) for storing the offset values αofs and βofs, which are difference values, as the correction data added to the actually detected rotational angles α and β of the first and second driven gears 15 and 16 when obtaining the rotational angle θ of the drive gear 14, or the steering shaft 12, which is the detection subject.

The correction data, or offset values αofs and βofs, are included in the rotational angles αrev and βrev of the first and second driven gears 15 and 16. The rotational angles αrev and βrev are rotational angles of the first and second driven gears 15 and 16 detected when the errors in the forward and reverse rotations caused by backlashes between the drive gear 14 and the first and second driven gears 15 and 16 are the same. In other words, the error A (steering error) caused by a backlash is equally allocated for the forward and reverse rotational directions. Therefore, the detection error is small compared to the rotational angle θ of the steering shaft 12 calculated from the rotational angles α and β of the first and second driven gears 15 and 16 detected when the errors in the forward and reverse rotations caused by backlash are biased and not equal. Thus, the rotational angle θ of the steering shaft 12 is detected more accurately.

(2) During the initialization, the offset values αofs and βofs, which are correction data for the rotational angle θ, are stored in the rotational angle detector 11. Thus, during actual use of the rotational angle detector 11, the offset values αofs and βofs are merely added to the actually detected rotational angles α and β of the first and second driven gears 15 and 16. As a result, there is no need to prepare a large amount of correction data corresponding to each rotational angle θ of the steering shaft 12. Further, the computation amount for correcting the rotational angle θ of the steering shaft 12 is minimized.

(3) The step for obtaining the forward direction error includes rotating the drive gear 14 by a predetermined angle θ in the forward direction (S1-2), and rotating the drive gear 14 by an angle equal to the angle θ in the reverse direction (S1-3). Further, the step for obtaining the forward direction error includes obtaining the rotational angles α1 and β2 of the first and second driven gears 15 and 16 when rotated in the reverse direction as the forward direction error (S1-5). The step for obtaining the reverse direction error includes rotating the drive gear 14 by the predetermined angle θb in the reverse direction (S1-6), rotating the drive gear 14 in the forward direction by an angle equal to the angle θb (S1-7), and obtaining the rotational angles α2 and β2 of the first and second driven gears 15 and 16 when rotated in the forward direction as the reverse direction error (S1-10).

During the initialization, the forward direction error is obtained by rotating the drive gear 14 by the predetermined angle θa in the forward direction and thereafter rotating the drive gear 14 by the predetermined angle θa in the reverse direction in the initialization step of the rotational angle detector 11. Further, the reverse direction error is obtained by rotating the drive gear 14 by a predetermined angle θb in the reverse direction and thereafter rotating the drive gear 14 by the predetermined angle θb in the forward direction. Thus, the forward direction error and the reverse direction error are acquired by a simple operation.

(4) The rotational angle detector 11 includes the EEPROM 26, which functions as a storage means for storing the correction data, and first and second magnetic sensors 20 and 21, which function as a detection means for detecting the rotational angles α and β of the first and second driven gears 15 and 16. Further, the rotational angle detector 11 includes a CPU 25 for adding the offset values αofs and βofs, or the correction data stored in the EEPROM 26, to the actual rotational angles α and β of the first and second driven gears 15 and 16 detected by the first and second magnetic sensors 20 and 21. Based on the rotational angles αrev and βrev obtained through the above addition, the CPU 25 further obtains the rotational angle β.

The offset values αofs and βofs are included in the rotational angles αrev and βrev of the first and second driven gears 15 and 16. The rotational angles αrev and βrev are rotational angles of the first and second driven gears 15 and 16 detected when the errors in the forward and reverse rotations caused by backlash between the drive gear 14 and the first and second driven gears 15 and 16 are the same. That is, the error Δ (detection error) is small compared to when the rotational angle θ is calculated based on the rotational angles α and β of the first and second driven gears 15 and 16 detected when errors in the forward and reverse rotations resulting from: backlash between the drive gear 14 and the first and second driven gears 15 and 16 are biased and not equal. Therefore, the rotational angle detector 11 of the present embodiment detects the rotational angle θ of the steering shaft 12 more accurately.

(5) The CPU 25 includes the correction data computer 29 functioning as a correction data computation means for computing the offset values αofs and βofs, or the correction data, during the initialization and storing the offset values αofs and βofs in the EEPROM 26.

By performing the computation of the offset values αofs and βofs with the correction data computer 29 in the rotational angle detector 11, the initialization of the rotational angle detector 11 does not have to be performed in cooperation with a vehicle system. This further simplifies the initialization of the rotational angle detector 11.

(6) The rotational angle detector 11 includes first and second magnets 17 and 18, which rotate integrally with the first and second driven gears 15 and 16, as a means for detecting the rotational angles α and β of the first and second driven gears 15 and 16. The rotational angle detector 11 further includes first and second magnetic sensors 20 and 21, which functions as a detection means facing the first and second magnets 17 and 18. The first and second magnetic sensors 20 and 21 generate detection signals corresponding to changes in the direction of the magnetic field generated from the first and second magnets 17 and 18.

With this structure, the first and second magnetic sensors 20 and 21 detect changes in the direction of the magnetic field generated by the first and second magnets 17 and 18 when the first and second driven gears 15 and 16 rotate. The first and second magnetic sensors 20 and 21 then generate detection signals corresponding to the changes in the direction of the magnetic field. The CPU 25 obtains the rotational angle θ of the steering shaft 12 based on the detection signals from the first and second magnetic sensors 20 and 21 and the offset values αofs and βofs stored in the EEPROM 26. In this manner, the structure of the rotational angle detector 11 is simplified by detecting the rotational angles α and β of the first and second driven gears 15 and 16 with the first and second magnetic sensors 20 and 21.

The rotational angles α and β of the first and second driven gears 15 and 16 may be obtained with, for example, an optical rotary encoder. However, the rotary encoder would require a circular plate having slits and arranged to rotate integrally with the steering shaft 12. The rotary encoder would also require a light generating element and a light receiving element arranged on opposite sides of the circular plate. Accordingly, when obtaining the rotational angles α and β of the first and second driven gears 15 and 16 with such a rotary encoder, there would be a limit to the reduction in the number of components, and further, to the simplification of the structure.

(7) In the rotational angle detector 11, the rotational angles α and β of the first and second driven gears 15 and 16 are each detected by the first and second magnetic sensors 20 and 21 and corrected with the offset values αofs and βofs stored in the EEPROM 26. Thus, the error Δ (steering error) caused by backlash is equally allocated for the forward and reverse rotational directions, and the error characteristic becomes uniform irrespective of the actual positional relationship of the drive gear 14, and the first and second driven gears 15 and 16. That is, the detection error of the rotational angle θ is reduced irrespective of the actual positional relationship of the drive gear 14 and the first and second driven gears 15 and 16. Therefore, the positional relationship of the drive gear 14 and the first and second driven gears 15 and 16 does not need to match the theoretical position if the steering angle is 0° when assembling the rotational angle detector 11 during manufacturing. In other words, the steering angle is regarded as 0° regardless of where the drive gear 14 and the first and second driven gears 15 and 16. This improves the assembling efficiency of the rotational angle detector 11.

It should be apparent to those skilled in the art that the present invention may be embodied in many other specific forms without departing from the spirit or scope of the invention. Particularly, it should be understood that the present invention may be embodied in the following forms.

In the processes (operation) shown in FIG. 9(a), the order for processing the group of step S1-2 to step S1-5 and the group of step S1-6 to step S1-9 may be changed. More specifically, the reverse direction error is acquired after the forward direction error in the present embodiment. However, the forward direction error may be acquired after the reverse direction error. This would also enable the rotational angles αave and βave, which are the average values of the forward direction error and the reverse direction error, to be obtained.

In the preferred embodiment, AMR sensors including anisotropic magneto-resistance elements (AMR elements) are used as the first and second magnetic sensors 20 and 21. However, other types of magnetic sensors may be used. For example, a Hall sensor including a hall element or a GMR sensor including a giant magneto-resistance element may be used. The Hall element generates detection signals corresponding to changes in the strength of the magnetic field of the first and second magnets 17 and 18 that change as the first and second driven gears 15 and 16 rotate. The GMR sensor generates detection signals corresponding to changes in the direction of the magnetic field in the same manner as the AMR sensor. Any type of magnetic sensor may be used as long as output signals that correspond to changes in the magnetic field of the first and second magnets 17 and 18 when the first and second driven gears 15 and 16 rotate are generated.

The EEPROM 26 is used as a storage means for storing various types of data such as correction data in the present embodiment. However, other types of non-volatile memories (ROM) may be used. A flash memory, an EPROM (erasable programmable ROM), and the like may be used as a storage means.

The rotational angles α and β of the first and second driven gears 15 and 16 are detected by first and second magnetic sensors 20 and 21 in the present embodiment. However, an optical rotary encoder may be used as the detection means of the rotational angles α and β. In this case, a circular plate, which includes slits, is arranged to rotate integrally with the steering shaft 12, and a light generating element and light receiving element are arranged on opposite sides of the circular plate.

In the preferred embodiment, the first and second magnets 17 and 18 are fixed to the first and second driven gears 15 and 16, and the first and second magnetic sensors 20 and 21 are fixed to the printed circuit board 19. However, the first and second magnets 17 and 18 may be fixed to the printed circuit board, and the first and second magnetic sensors 20 and 21 may be fixed to the printed circuit board 19.

The first and second magnets 17 and 18 are permanent magnets in the present embodiment. However, the first and second magnets 17 and 18 may be electromagnets that generate magnetic force (magnetic field) when supplied with current.

In the present embodiment, the rotational angle detector 11 is used to detect the rotational angle θ of the steering shaft 12. However, the rotational angle detector 11 may be used to obtain the rotational angle of other rotational bodies (detection subjects) such as an engine crankshaft, an industrial robot arm, and the like.

The present examples and embodiments are to be considered as illustrative and not restrictive, and the invention is not to be limited to the details given herein, but may be modified within the scope and equivalence of the appended claims.

What is claimed is:

1. A method for initializing a rotational angle detector for detecting rotational angles of two driven gears mated with a drive gear, which rotates integrally with a detection subject, and obtaining rotational angle of the detection subject from the detected rotational angles, the method comprising the steps of:
   obtaining a first error generated in each rotational angle of the two driven gears due to backlash between the drive gear and the two driven gears when the drive gear is rotated in a forward direction;
   obtaining a second error generated in each rotational angle of the two driven gears due to backlash between the drive gear and the two driven gears when the drive gear is rotated in a reverse direction;
   obtaining an average value of the first error and the second error;
   obtaining a difference between the average value and an error-free theoretical rotational angle for each of the two driven gears when the rotational angle of the drive gear is 0°; and
   storing the difference as correction data added to each actually detected rotational angle of the two driven gears when obtaining the rotational angle of the detection subject.

2. The method according to claim 1, wherein:
   the step of obtaining the first error includes:
      rotating the drive gear by a predetermined angle in the forward direction;
      rotating the drive gear by an angle equal to the predetermined angle in the reverse direction; and
      obtaining each rotational angle of the two driven gears when the drive gear is rotated in the reverse direction as the first error; and
   the step of obtaining the second error includes:
      rotating the drive gear by a predetermined angle in the reverse direction;
      rotating the drive gear by an angle equal to the predetermined angle in the forward direction; and obtaining each rotational angle of the two driven gears when the drive gear is rotated in the forward direction as the second error.

3. A rotational angle detector for detecting rotational angles of two driven gears mated with a drive gear, which rotates integrally with a detection subject, and obtaining a rotational angle of the detection subject from the detected rotational angles, the rotational angle detector comprising:

a memory for storing correction data, the correction data including a difference between an average value of first and second errors and an error-free theoretical rotational angle for each of the two driven gears when the rotational angle of the drive gear is 0°, in which the first error is generated in each rotational angle of the two driven gears due to backlash between the drive gear and the two driven gears when the drive gear is rotated in a forward direction, and the second error is generated in each rotational angle of the two driven gears due to backlash between the drive gear and the two driven gears when the drive gear is rotated in a reverse direction;

a detector for detecting each rotational angle of the two driven gears; and a controller for adding the correction data stored in the memory to actual rotational angles of the two driven gears detected by the detector, and obtaining the rotational angle of the detection subject based on the rotational angles after the addition.

4. The rotational angle detector according to claim 3, wherein the controller includes a correction data computer for computing the correction data used when the rotational angle detector is initialized and storing the correction data in the memory.

5. The rotational angle detector according to claim 3, wherein the detector includes:

a magnet arranged on each of the two driven gears to rotate integrally with the associated driven gear; and a magnetic sensor provided for each magnet and arranged facing toward the associated magnet, the magnetic sensor generating a detection signal corresponding to a change in direction of a magnetic field generated by the associated magnet or a change in strength of the magnetic field.

6. A rotational angle detector for detecting rotational angles of two driven gears mated with a drive gear, which rotates integrally with a detection subject, and obtaining a rotational angle of the detection subject from the detected rotational angles, the rotational angle detector comprising:

a storage means for storing correction data, the correction data including a difference between an average value of first and second errors and an error-free theoretical rotational angle for each of the two driven gears when the rotational angle of the drive gear is 0°, in which the first error is generated in each rotational angle of the two driven gears due to backlash between the drive gear and the two driven gears when the drive gear is rotated in a forward direction, and the second error generated in each rotational angle of the two driven gears due to backlash between the drive gear and the two driven gears when the drive gear is rotated in a reverse direction;

a detection means for detecting each rotational angle of the two driven gears; and a control means for adding the correction data stored in the storage means to actual rotational angles of the two driven gears detected by the detection means, and obtaining the rotational angle of the detection subject based on the rotational angles after the addition.

7. The rotational angle detector according to claim 6, wherein the control means includes a correction data computation means for computing the correction data used when the rotational angle detector is initialized and storing the correction data in the storage means.

8. The rotational angle detector according to claim 6, wherein the detection means includes:

a magnet arranged on each of the two driven gears to rotate integrally with the associated driven gear; and a magnetic sensor provided for each magnet and arranged facing toward the associated magnet, the magnetic sensor generating a detection signal corresponding to a change in direction of a magnetic field generated by the associated magnet or a change in strength of the magnetic field.

* * * * *